Feb. 11, 1969  A. L. McKEAN  3,427,394

HIGH VOLTAGE CABLE

Filed Nov. 14, 1966

INVENTOR
ALEXANDER L. McKEAN

BY
Davis, Hoxie, Faithfull & Hapgood
ATTORNEYS.

United States Patent Office 3,427,394
Patented Feb. 11, 1969

3,427,394
HIGH VOLTAGE CABLE
Alexander L. McKean, Ardsley, N.Y., assignor to Phelps Dodge Copper Products Corporation, New York, N.Y., a corporation of Delaware
Filed Nov. 14, 1966, Ser. No. 593,954
U.S. Cl. 174—35        5 Claims
Int. Cl. H05k 9/00

ABSTRACT OF THE DISCLOSURE

The central conductor is covered by an auxiliary shield, and between the latter and a surrounding outer shield assembly is a layer of primary insulation constituted by a laminated tape comprising a thin carrier layer of perforated resinous material and a substantially thicker layer of low density paper having plastic fibers, the paper having a density in the range of 0.4 to 0.8 gram per cubic centimeter and being bonded to and supported by the carrier layer.

---

Figure 1:
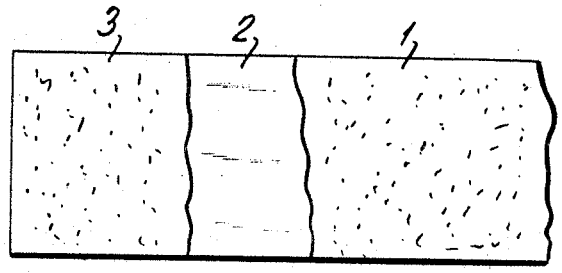

The present invention relates to electrical power cable, and more particularly to an improved insulation for such cable.

The ever increasing need for larger blocks of electrical power in urban areas has focused renewed attention on the advantages of power transmission at extra high voltages. Overhead transmission lines are under construction or in operation in various areas of the U.S. designed to operate at 345 kv., 550 kv. and even 750 kv. However, such transmission systems must resort to underground cable in metropolitan areas, and hence new cable insulations for 550 kv. and 750 kv. systems must be developed in order to provide the underground EHV cable necessary to complete the transmission line routes within the suburbs and city proper.

In addition to adequate dielectric strength to ensure long service life at extra-high voltages, a fundamental and most essential requirement of an EHV insulation is low power (dissipation) factor. Low power factor is essential because otherwise the magnitude of the dielectric heating (due to the presence of the high voltage) would make it impossible for the cable to transmit any useful electric power, without jeopardizing the operating stability and useful life of the cable. For example, in a typical installation of 138 kv. cable having a dissipation factor of 0.25%, the reduction in power rating due to dielectric loss would amount to only a few percent. At 230 kv., the derating factor would be about 20%, and at 550 kv., the derating factor would be close to 100%, making it virtually impossible to transmit any useful power.

Even with the finest quality paper cable designs available today, auxiliary cooling of the cable system would be required for normal service at 500 kv. and above.

It is an object of the present invention to provide an insulating system affording a much lower dielectric loss (heating), making it practical to operate efficiently at EHV levels without auxiliary cooling, except possibly during emergency overload conditions.

In accordance with the present invention, the cable conductor of copper or aluminum is covered with an auxiliary shield either in extruded or tape form. This core is then lapped with a special tape whose windings form the primary insulation of the cable. The tape consists of a very thin layer of a polyester sheet, having bonded to it a thicker layer of low density paper made of plastic or of a combination of plastic and cellulose. The polyester tape serves as a carrier to support the low-loss, low density paper, which by itself would be too weak to wind satisfactorily on a cable core.

The power factor of the plastic paper, which is reflected in the increased efficiency of the cable, is much superior in this respect compared to other compatible paper insulating system for cable.

An over-all shield tape assembly, applied over the insulation, completes the electric cable design, which is then oil-impregnated and enclosed within an impervious oil-filled sheath or pipe.

The exceptional performance of impregnated paper insulation in high voltage cable service is due in large measure to the complete affinity (wetting) of the cellulose for the impregnant, the labyrinth path of the fiber structure, and the ebb and flow of liquid impregnant, all of which act to prevent the initiation of incipient failure and thus contribute to maintenance of a highly stable dielectric. By using low density paper of plastic or plastic and cellulose, not only is this excellent performance retained but an additional important advantage is provided, namely, that of lower power (dissipation) factor, for example, 0.02% instead of 0.2% typical of cellulose paper cable design.

Despite the advances over the years in the development of plastic or synthetic film materials for electrical insulation, a completely practical design has not been attained for a high-voltage cable having all-synthetic tape insulation. Among the reasons for this are the problems encountered in impregnation because the insulating film tape is impervious to oil, and the fact that the mechanics of manufacture are more difficult than with paper tape. Moreover, the synthetic film tape can impose limitations in cable-core flexibility during handling and reeling; and reserve electrical stability of such an oil-impregnated cable system, under loss of operating pressure, is markedly reduced as compared to cable insulated with paper tape.

Dielectric constant is the second equally important characteristic of a cable insulation which directly affects dielectric loss heating. Since the best EHV cables made with oil-impregnated paper exhibit a value of "$k$" no lower than about 3.4, there is definite need to reduce the value of this dielectric constant; and the present invention provides for a substantial reduction, for example, in the order of 20 to 30 percent.

Figure 2:
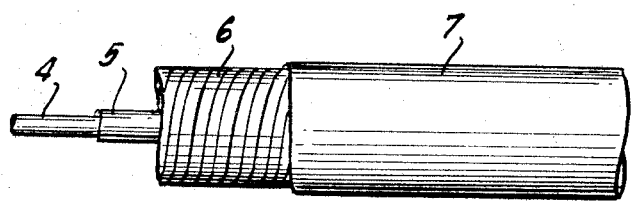

The following is a detailed description of a preferred embodiment of the invention, with reference to the accompanying drawing, in which:

FIG. 1 is a plan view of the tape used as the primary insulation, with its various layers exposed, and FIG. 2 is a plan view of the cable of the present invention with its layers cut back to illustrate the various materials of those layers.

The tape shown in FIG. 1 consists of a top layer 1 of plastic, low-density paper, a thin layer of polyester sheet 2, and a bottom layer 3 of plastic, low-density paper. Actually, only one layer of the plastic paper need be used, so that the tape may consist only of a relatively thick layer of plastic paper and a relatively thin layer of polyester film.

The low-density paper may be made from fibers of either plastic or a composite of plastic and cellulose. By "low-density" is meant a density in the range of 0.4 to 0.8 grams per cubic centimeter, but this is the preferred range and should not be considered restrictive. In contrast, ordinary cellulose papers used in cable insulation exhibit a density between 0.7 and 1.0.

Suitable plastics for such paper include polycarbonate, polyphenylene-oxide, polyesters, polyethers, and polyolefins such as polyethylene or polypropylene. Plastic papers made from these materials are porous, and are made from fibers formed on a foudrinier screen and then dried and calendered, as in the normal cellulose papermaking process. By "composite material" is meant a mixture of electrical grade cellulose and plastic fibers forming a low-density synthetic paper sheet.

Synthetic paper produced up to the present time, unlike standard cellulose paper, has lacked the tensile strength and flexibility required for use as tape insulation in high voltage cable constructions. However, when it is laminated to, or otherwise carried by, a tape which is physically adaptable and which is operable in cable taping machines, then the exceptionally good insulating properties of the plastic paper becomes a practical reality in the form of tape insulation on a high voltage cable.

I have tried several forms of tape for the carrier. Of these, a polyester sheet is considered one of the most practical, since it has strength-to-thickness properties (modulus) that make it ideal. A suitable polyester film is a sheet of ¼ mil thick "Mylar," a polyethylene terephthalate product of Du Pont.

A polyester film is superior, in this use, to tapes made from polyolefin, as it has a much superior thermal expansion characteristic in the sense that it is very much lower, approximately one-tenth as great. Mylar also exhibits higher softening temperature, about 265° C., compared to polyolefins such as polypropylene (170° C.) and polyethylene (100° C.+). The polyester carrier tape may be perforated to provide oil channels between the layers of porous paper, thus enhancing the oil penetration and impregnation process throughout the dielectric. The perforated area should be uniformly distributed and restricted to 10% (or less) of the virgin tape.

A laminated tape of plastic paper and perforated polyester film may be prepared (1) in separate sheets and then laminated, or (2) the polyester may be flow-laminated by conventional extrusion techniques directly onto the paper, or (3) the plastic film may be temporarily bonded to the plastic paper by a special wax which may be dissolved in an oil in a later step, leaving only the polyester film and the plastic paper, or (4) in the case of a plastic or composite fiber paper, the polyester film may be heat-bonded to the low-density material, or (5) the paper may be otherwise attached to the polyester tape to be carried by it onto the cable taping machine.

In the prior art it has been stated (e.g., Garner Patent No. 3,194,872) that recent developments have resulted in the production of oil-impregnated paper insulations having a power (dissipation) factor as low as 0.15% with a dielectric constant of about 3.4. The power factor of my improved insulation, however, has been shown by tests to be much lower than 0.15% and, as a matter of fact, generally in the low range from 0.05% to 0.08% at 80° C., for composite papers, and in the range from 0.02% to 0.05% for all-plastic papers.

Impregnation of the cable dielectric with an insulating oil will be facilitated by the porous nature of the low-density plastic paper tape insulation layer described herein, and by the perforated structure of the polyester carrier tape. In addiiton, the impregnating process is naturally augmented by the oil penetration through the butt space channels throughout the laminar dielectric wall.

The type of polyester or other carrier tape should be electrical grade but is not of primary importance to my invention, since the dominant influence on the resultant power factor comes from the plastic low-density paper, which constitutes the major insulation element by a ratio of 20 to 1 or greater. For example, another suitable carrier film to support the plastic paper is a thin film of polycarbonate.

The cable illustrated in FIG. 2 comprises a central copper or aluminum stranded conductor 4, an auxiliary conductor shield layer 5, a thick layer 6 (the thickness being, for example, 1.25 inches in a cable designed to operate at 500,000 volts) of primary insulation comprising many layers of the special tape described above; and an outer shield tape assembly 7 completing the electric cable construction. This EHV cable is impregnated and then installed in an impervious sheath or pipe, and filled with a suitable low-loss impregnating oil, either mineral or synthetic.

I claim:
1. In a high voltage cable, the combination of a cable core having a central conductor and an auxiliary shield covering said conductor, a laminated tape comprising a thin carrier layer of resinous material and a substantially thicker layer of low-density paper having plastic fibers, said paper having a density in the range of 0.4 to 0.8 gram per cubic centimeter and being bonded to and supported by said carrier layer, said carrier layer having a substantially higher tensile strength than the low density paper layer so as to reinforce said paper layer mechanically, said paper layer constituting the major electrical insulation of the laminated tape and having the dominating influence on the power factor of said tape, said laminated tape being wound around the cable core and forming the primary insulation, and an outer shield assembly surrounding said primary insulation.

2. The combination according to claim 1, in which said carrier layer is a polyester.

3. The combination according to claim 1, in which said paper has only plastic fibers.

4. The combination according to claim 1, in which said paper has cellulose fibers in addition to said plastic fibers.

5. The combination according to claim 1, in which said carrier layer is perforated.

References Cited

UNITED STATES PATENTS

| 2,190,711 | 2/1940 | Hanson. | |
| 3,078,333 | 2/1963 | Kang | 174—120 |
| 3,114,670 | 12/1963 | Iwasaki | 162—146 |
| 3,194,872 | 7/1965 | Garner | 174—25 |

FOREIGN PATENTS

38/5,853  5/1963  Japan.

OTHER REFERENCES

Birks, J. B.: Modern Dielectric Materials, Heywood, London, 1960, p. 119.

The Institute of Paper Chemistry, vol. 26, No. 11, July 1956, p. 920.

LEWIS H. MYERS, *Primary Examiner.*

ELLIOT A. GOLDBERG, *Assistant Examiner.*

U.S. Cl. X.R.

162—138; 174—25, 121